United States Patent
Newsome et al.

(10) Patent No.: US 11,892,116 B2
(45) Date of Patent: Feb. 6, 2024

(54) FLUID COUPLING AND SLEEVE THEREFOR

(71) Applicant: Eaton Intelligent Power Limited, Dublin (IE)

(72) Inventors: William H. Newsome, Dexter, MI (US); Gary M. Jenski, Jr., Jackson, MI (US)

(73) Assignee: Eaton Intelligent Power Limited, Dublin (IE)

( * ) Notice: Subject to any disclaimer, the term of this patent is extended or adjusted under 35 U.S.C. 154(b) by 561 days.

(21) Appl. No.: 16/816,418

(22) Filed: Mar. 12, 2020

(65) Prior Publication Data

US 2020/0292122 A1    Sep. 17, 2020

Related U.S. Application Data

(60) Provisional application No. 62/817,836, filed on Mar. 13, 2019.

(51) Int. Cl.
    *F16L 57/04*    (2006.01)
    *F16L 37/40*    (2006.01)

(52) U.S. Cl.
    CPC ............... *F16L 57/04* (2013.01); *F16L 37/40* (2013.01)

(58) Field of Classification Search
    CPC .................................. F16L 57/04; F16L 59/145
    See application file for complete search history.

(56) References Cited

U.S. PATENT DOCUMENTS

| 3,330,529 | A | * | 7/1967 | Hansson | F16L 37/40 |
| | | | | | 251/149.6 |
| 3,346,016 | A | * | 10/1967 | Blau | F16L 59/145 |
| | | | | | 220/62.16 |
| 4,675,221 | A | | 6/1987 | Lalikos et al. | |
| 4,942,903 | A | | 7/1990 | Jacobsen | |
| 2002/0101076 | A1 | * | 8/2002 | Barrier | F16L 29/02 |
| | | | | | 285/91 |
| 2015/0260329 | A1 | * | 9/2015 | Bond | F16L 57/06 |
| | | | | | 428/68 |
| 2018/0087708 | A1 | | 3/2018 | Jenski | |

FOREIGN PATENT DOCUMENTS

| JP | 2008101762 A | 5/2008 | |
| WO | 9742443 A1 | 11/1997 | |
| WO | WO-2013004306 A1 * | 1/2013 | ............. B32B 5/022 |
| WO | WO-2016026986 A1 * | 2/2016 | ............. F16L 59/147 |
| WO | 16/172163 A1 | 10/2016 | |
| WO | WO-2016172163 A1 * | 10/2016 | ............. F16L 15/08 |

OTHER PUBLICATIONS

European Search Report, EP20162848, dated Jul. 17, 2020.

* cited by examiner

*Primary Examiner* — Zachary T Dragicevich
*Assistant Examiner* — James A Linford
(74) *Attorney, Agent, or Firm* — MERCHANT & GOULD P.C.

(57) ABSTRACT

A fluid coupling includes a first coupling member, a second coupling member configured for connection with the first coupling member, and a sleeve disposed at least partially around the first coupling member and/or the second coupling member. In embodiments, the sleeve may include a first flame-retardant layer, a second flame-retardant layer, a third flame-retardant layer, and at least one reinforcement of a non-rubber, rigid material.

9 Claims, 10 Drawing Sheets

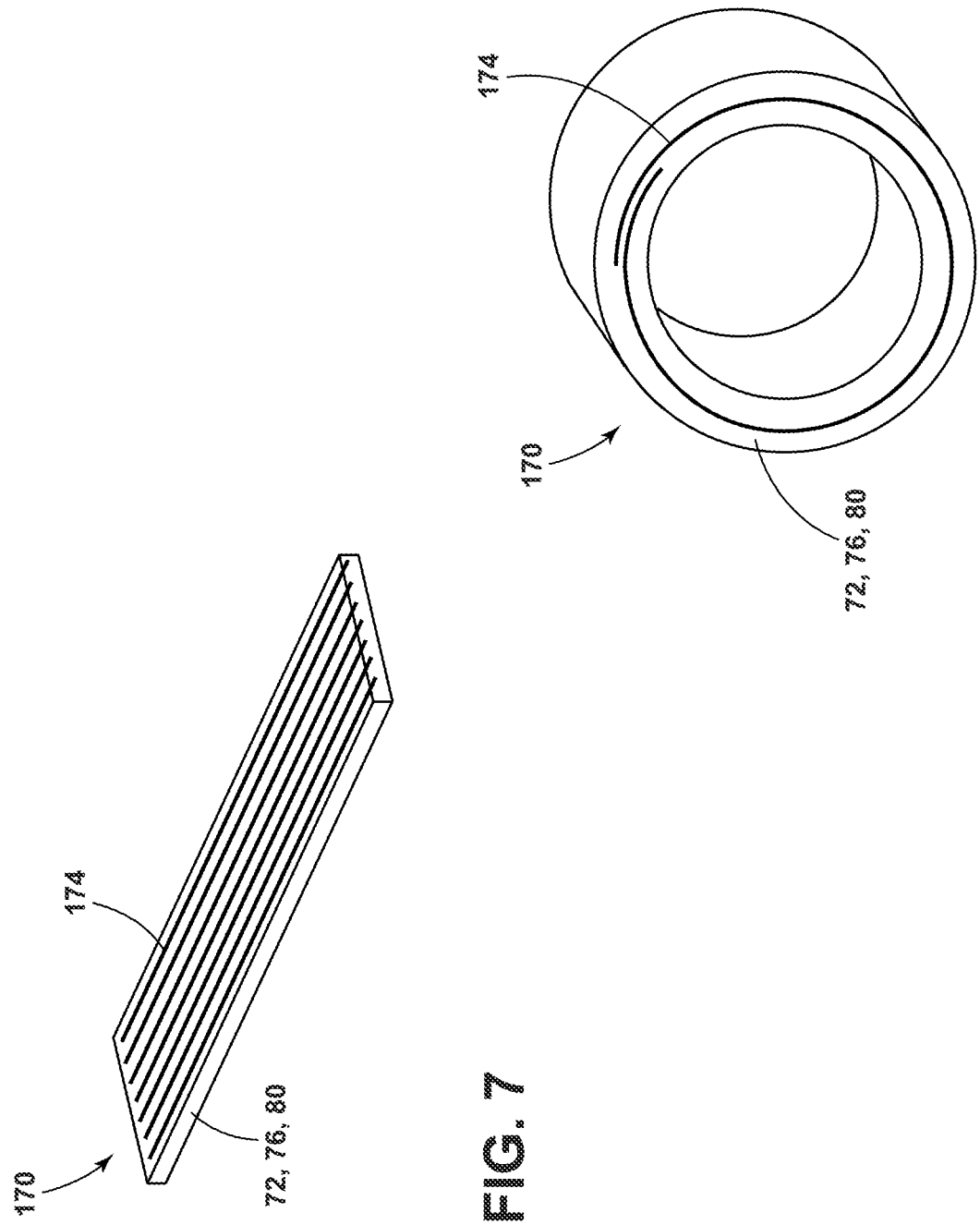

FLUID COUPLING AND SLEEVE THEREFOR

CROSS-REFERENCE TO RELATED APPLICATIONS

This application claims priority to U.S. Provisional Application No. 62/817,836, filed on Mar. 13, 2019, the contents of which are herein incorporated by reference in their entirety.

TECHNICAL FIELD

The present disclosure generally relates to fluid couplings and sleeves, including quick-disconnect fireproof fluid couplings having sleeves.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid couplings are not fireproof and/or are not capable of withstanding high temperatures, such as to comply with AS1055.

An example of a fireproof coupling is generally described in United States Patent Application Publication US 2018/0087708, which is hereby incorporated by reference as though fully set forth herein.

There is a desire for solutions/options that minimize or eliminate one or more challenges or shortcomings of fluid couplings. The foregoing discussion is intended only to illustrate examples of the present field and should not be taken as a disavowal of scope.

SUMMARY

In embodiments, a fluid coupling may include a first coupling member, a second coupling member configured for connection with the first coupling member, and/or a sleeve disposed at least partially around the first coupling member and/or the second coupling member. In embodiments, the sleeve may include a first flame-retardant layer, a second flame-retardant layer, a third flame-retardant layer, and at least one reinforcement comprising a non-rubber, rigid material.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 7 is a perspective view generally illustrating an embodiment of a sleeve in an unassembled state according to teachings of the present disclosure.

FIG. 8 is a perspective view generally illustrating an embodiment of a sleeve in an assembled state according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
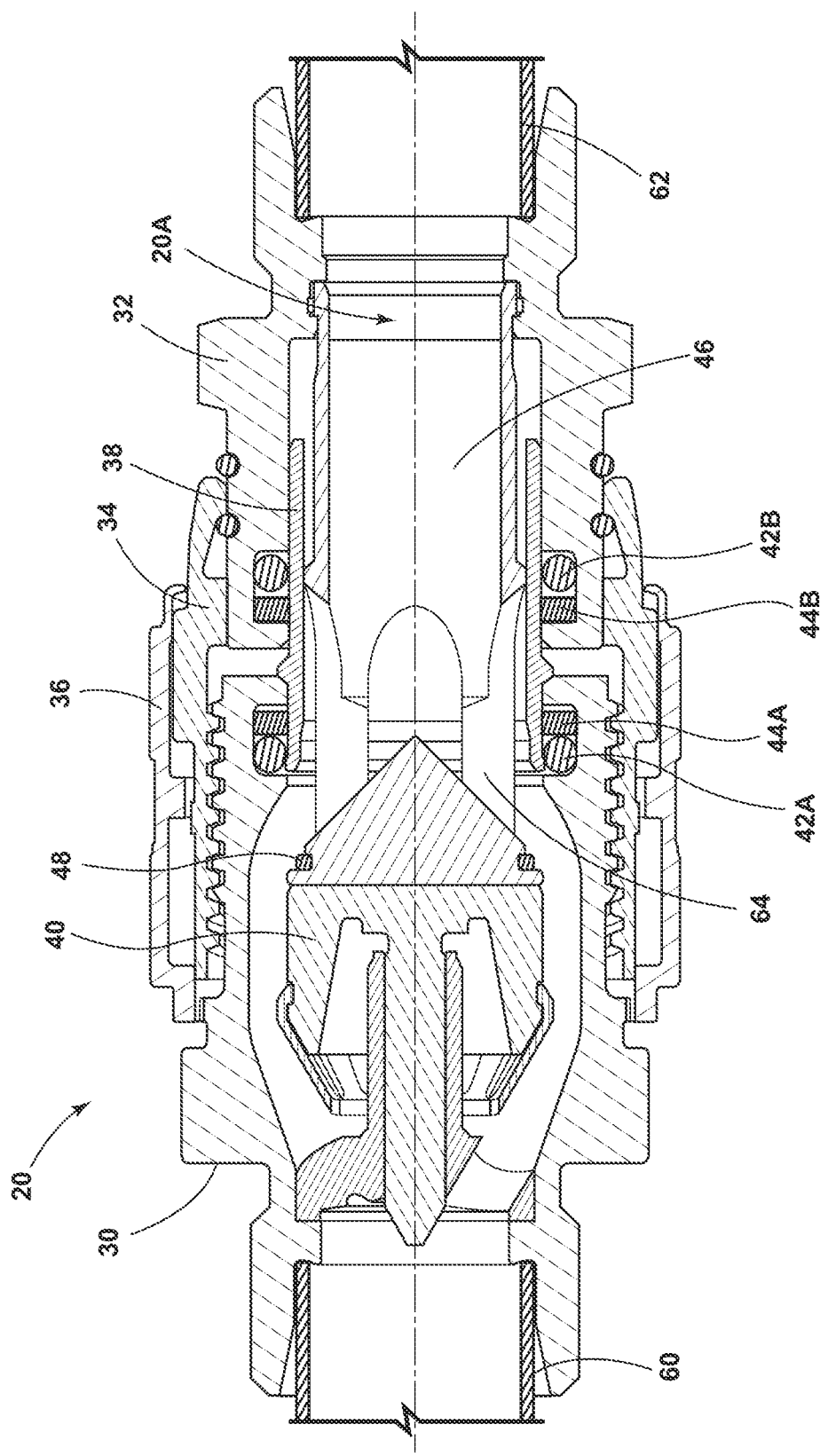
FIG. 1 is a cross-sectional view generally illustrating a fluid coupling.

In embodiments, such as generally illustrated in FIG. 1, a fluid coupling 20 may include a first coupling member 30 (e.g., a male adapter), a second coupling member 32 (e.g., a female adapter), a nut 34, a locking sleeve 36, a valve sleeve 38, a poppet valve 40, one or more sealing members 42A, 42B (e.g., O-rings), one or more back-up rings 44A, 44B, a tubular valve 46, and/or a bonded seal 48. The first coupling member 30 may be configured for connection with a first fluid conduit 60. The second coupling member 32 may be configured for connection with a second fluid conduit 62. The first coupling member 30 and the second coupling member 32 may be configured to provide fluid communication between the first fluid conduit 60 and the second fluid conduit 62. The fluid coupling 20 may be configured as a quick-disconnect coupling. The fluid coupling 20 may include an axis 20A, which may be a central axis.

With embodiments, in a disconnected position of the first coupling member 30 and the second coupling member 32, the valve sleeve 38 may contact the bonded seal 48 and a sealing member 42B connected to the second coupling member 32, which may restrict and/or prevent fluid flow through the second coupling member 32. The poppet valve 40 may contact a sealing member 42A connected to the first coupling member 30, which may restrict and/or prevent fluid flow through the first coupling member 30.

With embodiments, in a connected position of the first coupling member 30 and the second coupling member 32, such as generally illustrated in FIG. 1, the nut 34 may be connected to (e.g., threaded onto) the first coupling member 30. As the nut 34 rotates, the first coupling member 30 may drive the valve sleeve 38 in a first axial direction (e.g., toward the second fluid conduit 62), which may open one or more ports 64 of the tubular valve 46. The valve sleeve 38 may then contact both of the sealing members 42A, 42B, which may provide a fluid seal between the first coupling member 30 and the second coupling member 32 and/or allow fluid flow through the fluid coupling 20. The locking sleeve 36 may restrict and/or prevent the nut 34 from disconnecting (e.g., unscrewing) from the first coupling member 30.

In embodiments, connecting and/or disconnecting the first coupling member 30 and the second coupling member 32 may include movement of the poppet valve 40, the valve sleeve 38, the nut 34, and/or the locking sleeve 36 relative to each other. Clearances may be provided between one or more of these components, such as to prevent binding during relative movement.

With embodiments, a fluid seal between the first coupling member 30 and the second coupling member 32 may depend, at least in part, on the integrity of the sealing members 42A, 42B. The sealing members 42A, 42B may, for example and without limitation, include an organic material with elastomeric properties (e.g., rubber). At high pressures (e.g., at least about 1500 psig), the back-up rings 44A, 44B may be configured to restrict deformation of the sealing members 42A, 42B into the clearances. The sealing members 42A, 42B may start to degrade at high temperatures, such as about 600 F. or greater. If the sealing members 42A, 42B degrade, the fluid seal may be compromised, and fluid may leak from the fluid coupling 20.

Figure 2:
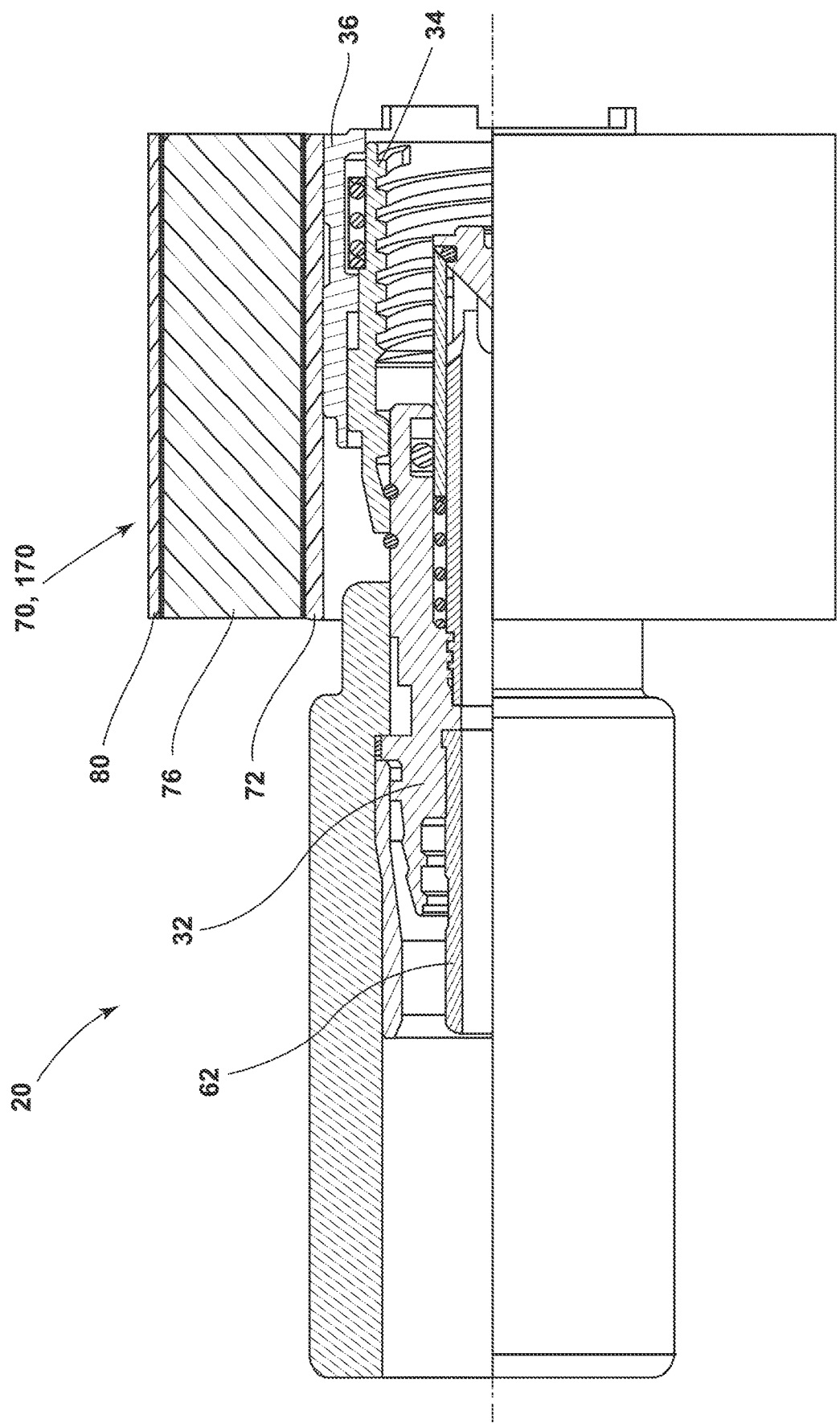
FIG. 2 is a cross-sectional view generally illustrating an embodiment of a fluid coupling including a sleeve according to teachings of the present disclosure.
Figure 3A:
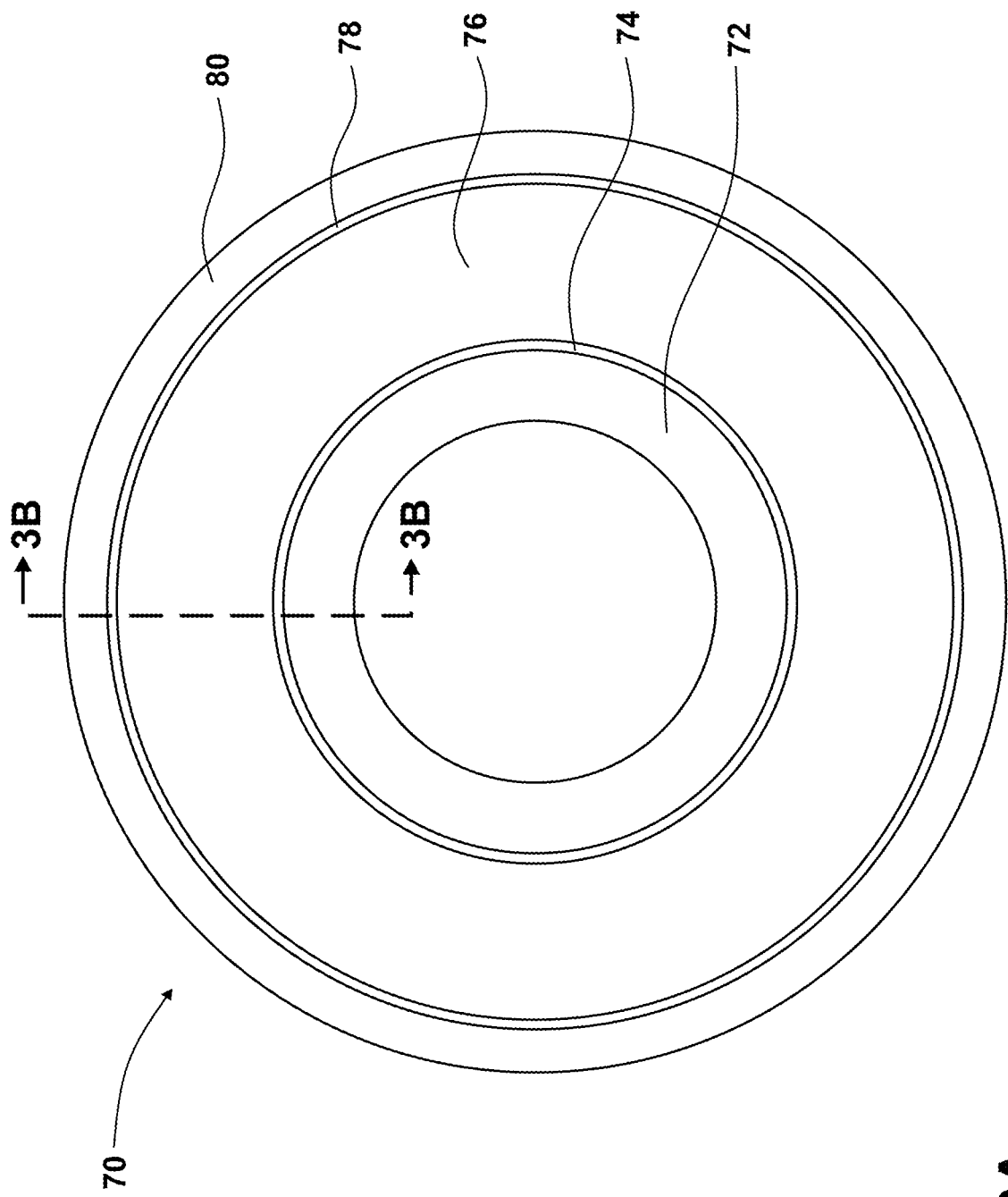
FIG. 3A is a perspective view generally illustrating an example of a sleeve according to teachings of the present disclosure.
Figure 3B:
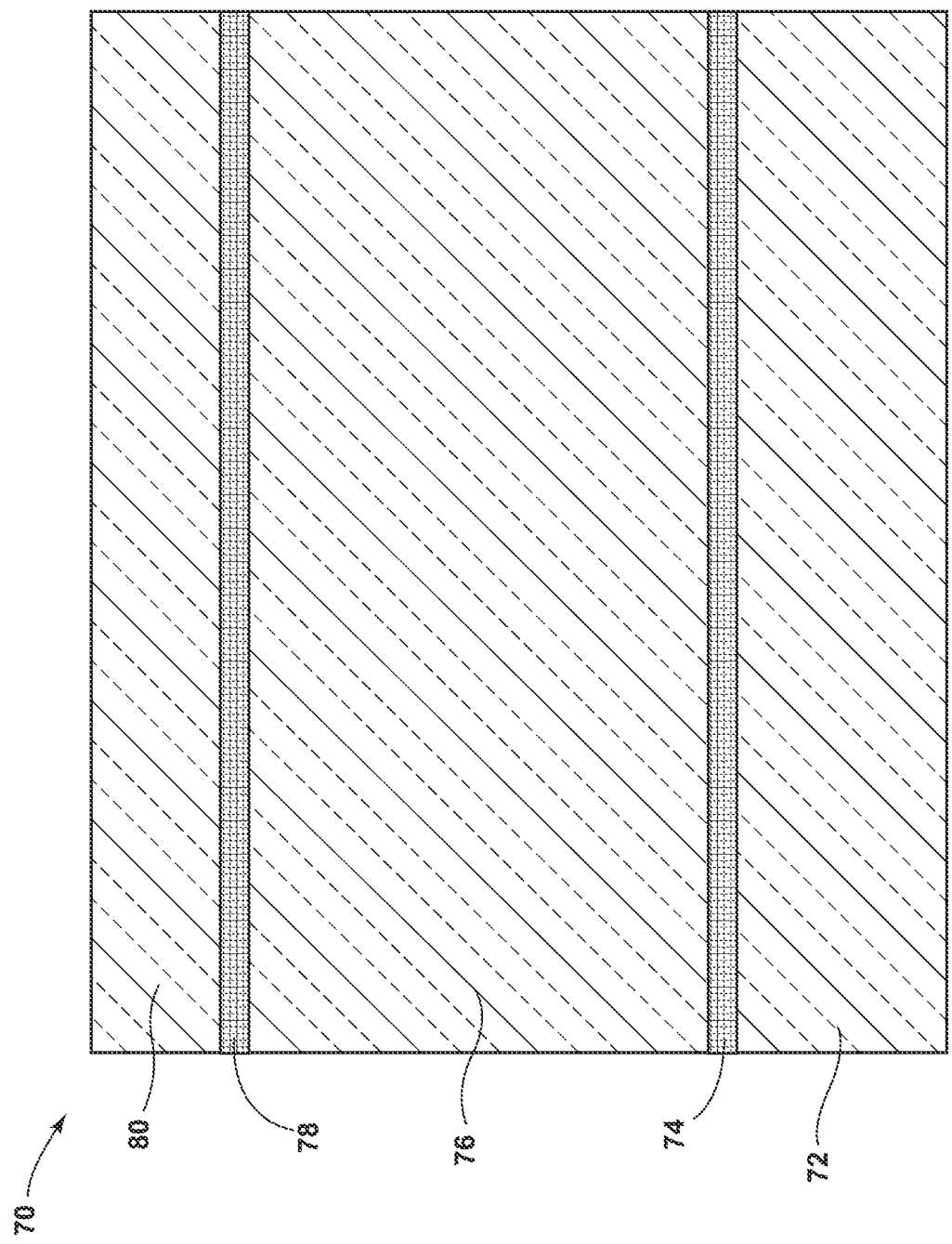
FIG. 3B is a cross-sectional view generally illustrating an embodiment of the sleeve of FIG. 3A according to teachings of the present disclosure.
Figure 9:
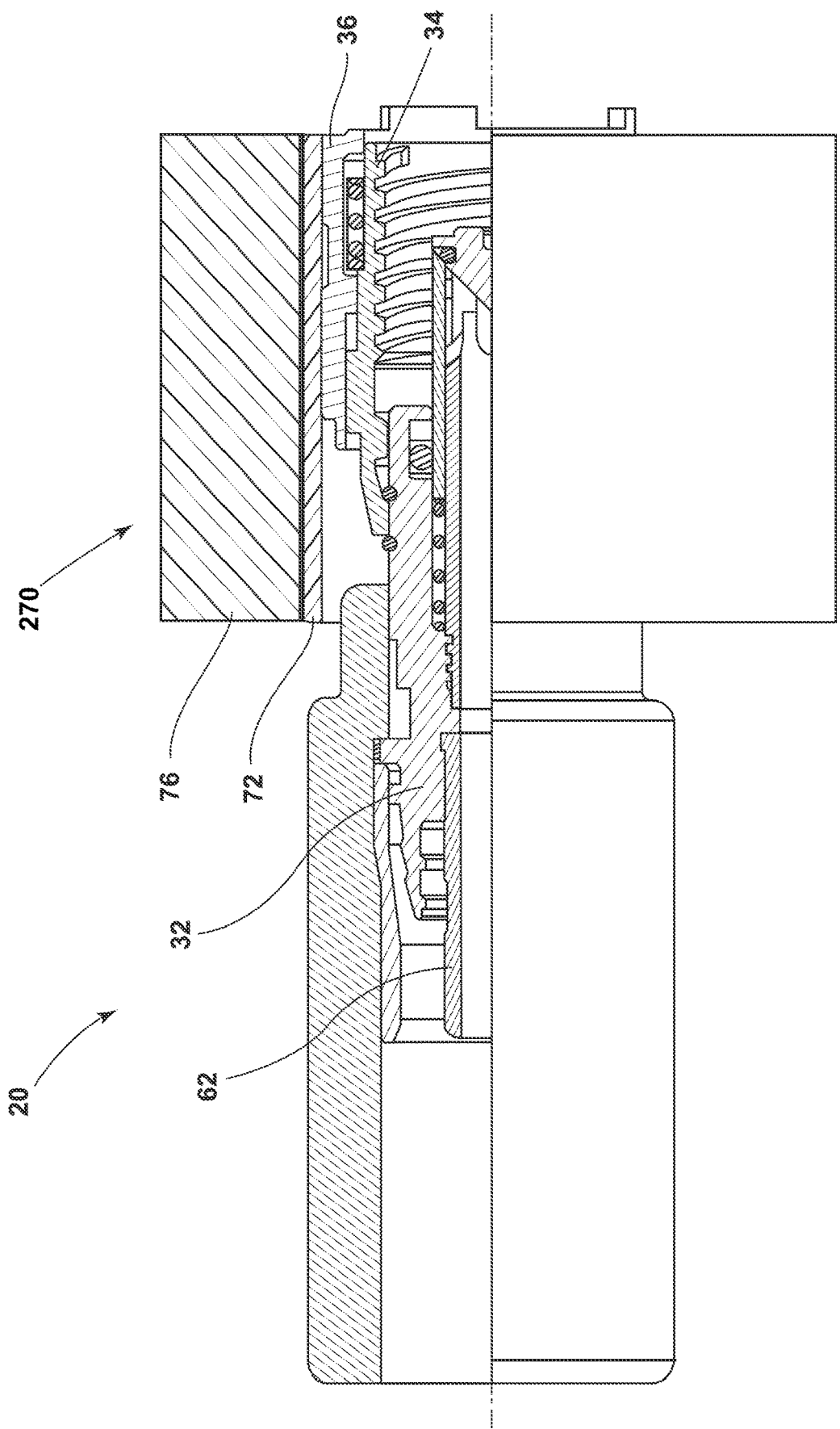
FIG. 9 is a cross-sectional view generally illustrating an embodiment of a fluid coupling including another sleeve according to teachings of the present disclosure.
Figure 10A:
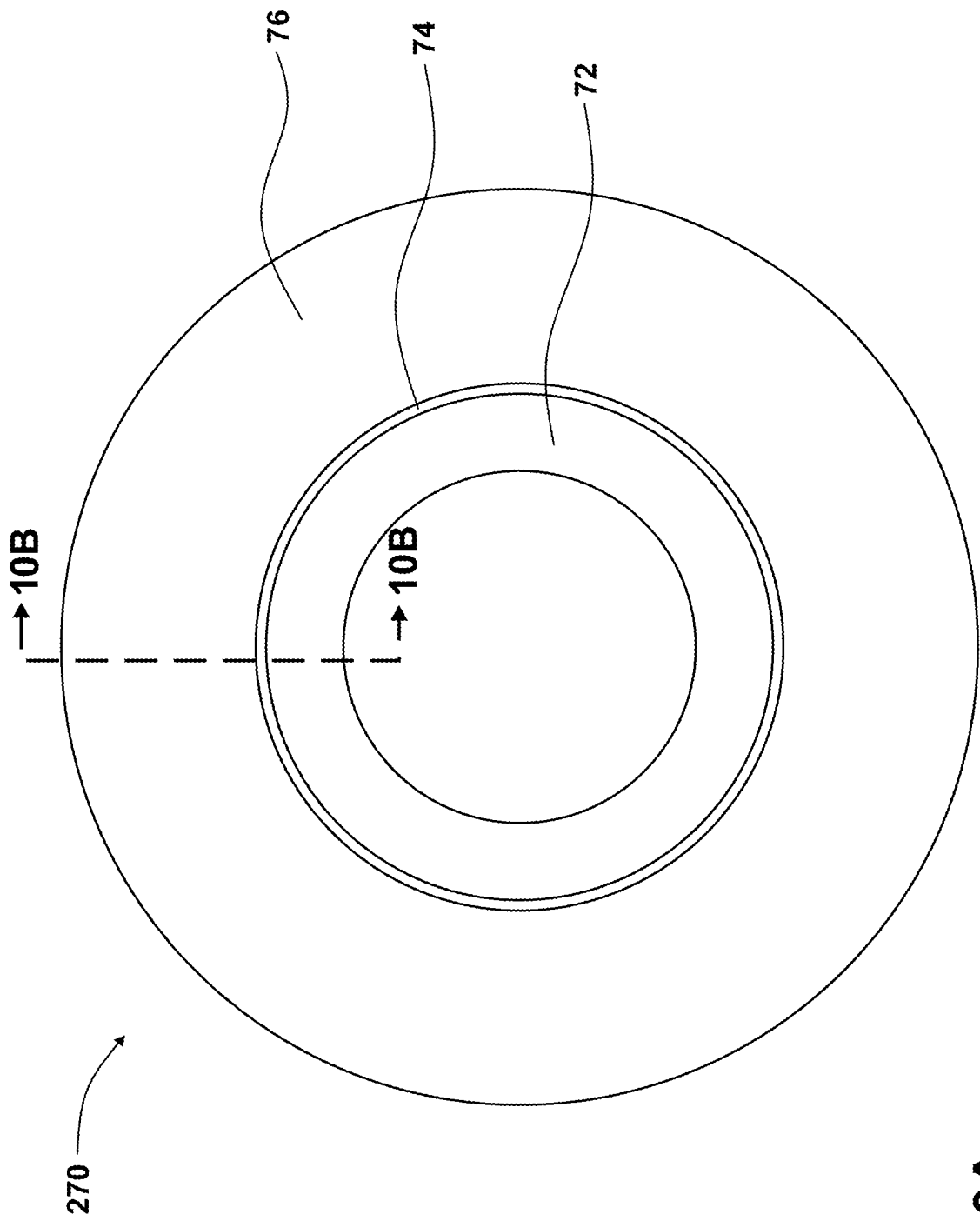
FIG. 10A is a perspective view generally illustrating an example of another sleeve according to teachings of the present disclosure.
Figure 10B:
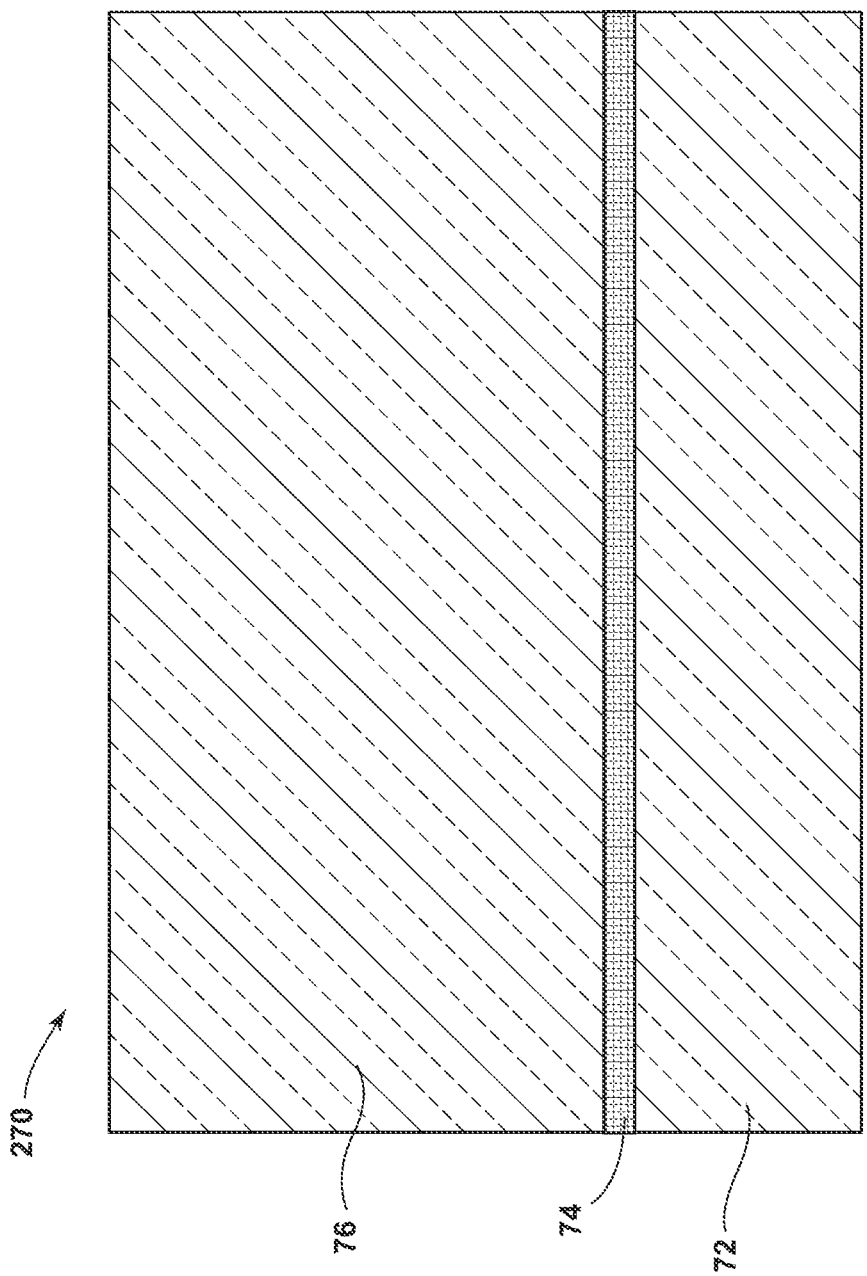
FIG. 10B is a cross-sectional view generally illustrating an embodiment of the sleeve of FIG. 10A according to teachings of the present disclosure.

With embodiments, such as generally illustrated in FIGS. 2 and 9, a fluid coupling 20 may include an outer sleeve 70, 270 that may be configured to provide thermal insulation to for the fluid coupling 20, such as to limit the maximum temperature of the sealing members 42A, 42B, which may help prevent leaks. An outer sleeve 70, 270 may include a first layer 72, a second layer 76, and/or a third layer 80. The first layer 72, the second layer 76, and/or the third layer 80 may include one or more fire-retardant and/or thermally insulating materials, such as, for example, silicone, and may be referred to herein as flame-retardant layers. The first layer 72 may be configured as an inner layer, and may connect and/or bond the outer sleeve 70 with the locking sleeve 36. The third layer 80 may be an external layer, may provide thermal insulation, and/or may facilitate connection/disconnection operations (e.g., a user may grip the third layer 80 to move the locking sleeve 36).

If exposed to high temperatures (e.g., in the event of a fire), the first layer 72, the second layer 76, and/or the third layer 80 may expand and/or become brittle/charred, at least in some sections. To account for this, in embodiments, such as generally illustrated in FIGS. 3A-8 and 10A-10B, the outer sleeve 70, 170, 270 may include at least one reinforcement 74, 78, 174. As generally illustrated in FIGS. 3A, 3B, 10A, and 10B, the reinforcement may be in the form of a first intermediate layer 74 and/or a second intermediate layer 78. The first intermediate layer 74 may be disposed at least partially around the first layer 72, and may be connected and/or bonded to an outer portion of the first layer 72 and/or an inner portion of the second layer 76 (e.g., may be disposed at least partially between the first layer 72 and the second layer 76). The first intermediate layer 74 may be configured to provide structural support to the first layer 72 and/or the second layer 76. The second intermediate layer 78 may be disposed at least partially around the second layer 76, and may be connected and/or bonded to an outer portion of the second layer 76 and/or an inner portion of the third layer 80 (e.g., the second intermediate layer 78 may be disposed at least partially between the second layer 76 and the third layer 80). The second intermediate layer 78 may provide structural support to the second layer 76 and the third layer 80. The first intermediate layer 74 and the second intermediate layer 78 may include a substantially similar configuration and the second intermediate layer may include a larger diameter than the first intermediate layer 74.

Figure 4:
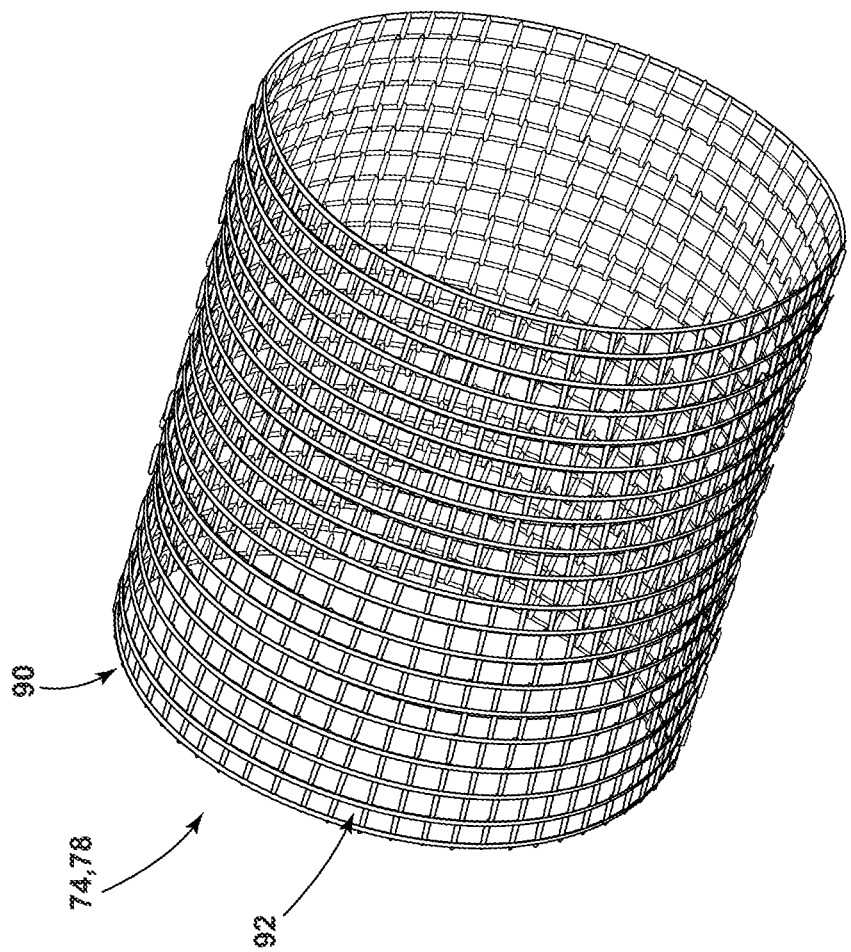
FIG. 4 is a perspective view generally illustrating an embodiment of a sleeve according to teachings of the present disclosure.

With embodiments, such as generally illustrated in FIG. 4, the first intermediate layer 74 and/or the second intermediate layer 78 may include a mesh configuration that may include woven and/or braided wires 90 that may be disposed such that one or more apertures 92 may be present between the wires 90. The intermediate layers 74, 78 may be relatively pliable and/or dent-resistant, such as due to the mesh configuration. With high temperatures, the first layer 72, the second layer 76, and/or the third layer 80 may expand, such as to extend into and/or through the one or more of the apertures 92 of the intermediate layers 74, 78. Permitting the first layer 72, the second layer 76, and/or the third layer 80 to expand relatively unimpeded (e.g., impeded only by the wires 90 as opposed to a solid surface) may facilitate the expansion, which may increase the effective thickness and/or the insulation performance of the outer cover 70. The expansion may involve breaking a continuous layer (e.g., the first layer 72, the second layer 76, and/or the third layer 80) into smaller sections that may be relatively lightweight and/or include brick-like structures. The smaller sections may protrude through the intermediate layers 74, 78 and/or at least partially encase the intermediate layers 74, 78. In contrast to covers with larger sections that may not be connected to intermediate layers (e.g., mesh layers), the smaller sections may have less mass and/or may be less prone to spall or break away when burned/charred. The intermediate layers 74, 78 may limit spalling and facilitate expansion of the first layer 72, the second layer 76, and/or the third layer 80 (e.g., for increase insulation performance).

Figure 6:
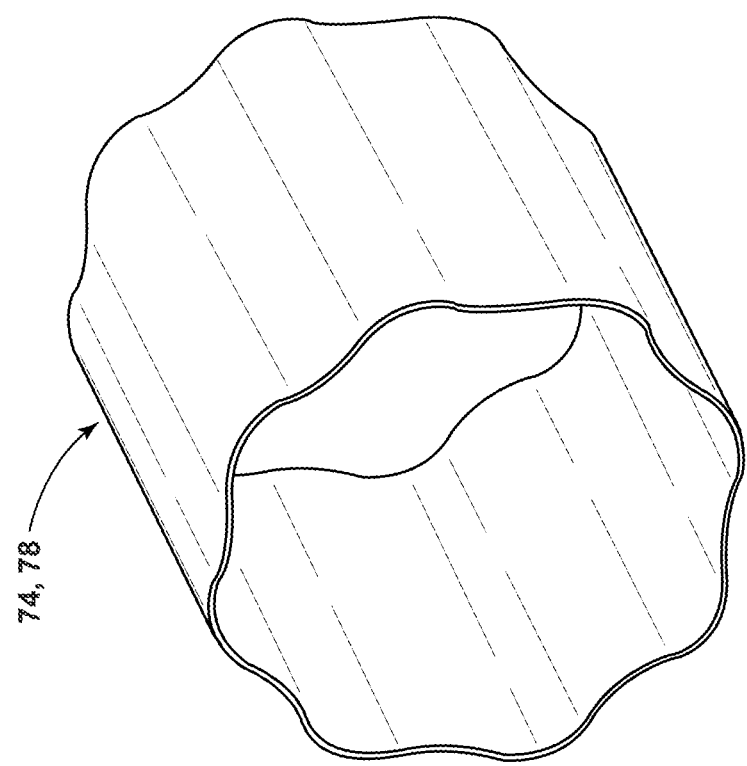
FIG. 6 is a perspective view generally illustrating an embodiment of a sleeve according to teachings of the present disclosure.
Figure 5:
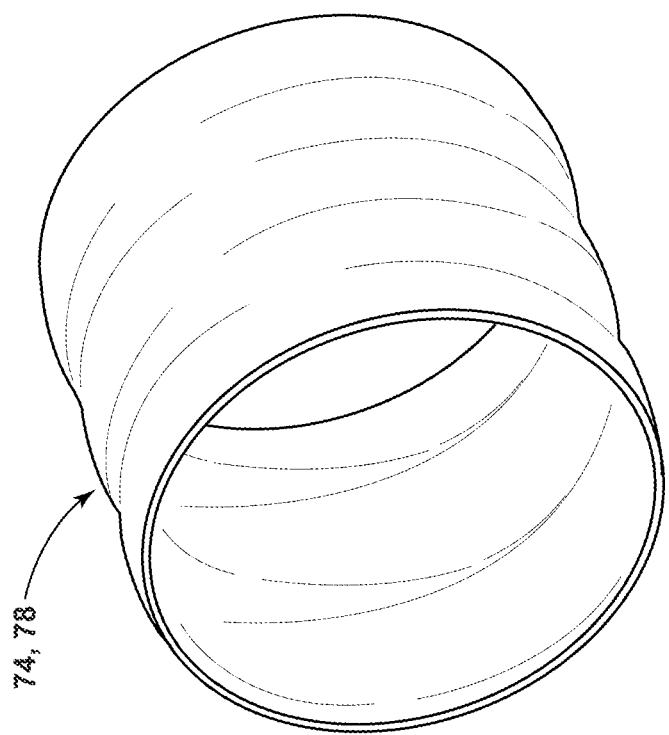
FIG. 5 is a perspective view generally illustrating an embodiment of a sleeve according to teachings of the present disclosure.

In embodiments, such as generally illustrated in FIGS. 5 and 6, the intermediate layers 74, 78 may include a corrugated configuration. An axial corrugation (e.g., with circumferentially extending protrusions and channels), such as generally illustrated in FIG. 5, may be configured to facilitate axial expansion of the first layer 72, the second layer 76, and/or the third layer 80. For example and without limitation, initial expansion may occur in the radial direction and the axial corrugation may transform the expansion into axial expansion. Axial expansion may involve the outer sleeve 70 covering (and insulating) some or an additional amount of the first coupling member 30. An azimuthal corrugation (e.g., with axially extending protrusions and channels), such as generally illustrated in FIG. 6, may be configured to facilitate radial expansion of the first layer 72, the second layer 76, and/or the third layer 80. For example and without limitation, an intermediate layer with an azimuthal configuration may be configured to expand, at least to some degree, with the first layer 72, the second layer 76, and/or the third layer 80. An azimuthal configuration may minimize an initial outer diameter of the fluid coupling 20 and/or may reduce the hoop stress generated on the intermediate layer(s) 74, 78.

It should be understood that although the embodiments of intermediate layers 74, 78 of FIGS. 5 and 6 are generally illustrated as solid, intermediate layers 74, 78 may include a mesh configuration and/or a corrugated configuration (e.g., a corrugated mesh configuration).

With embodiments, one or more of the first layer 72, the second layer 76, and/or the third layer 80 may include an intumescent material, such as in addition to a flame-retardant material (e.g., silicone), which may facilitate growth of that layer and/or the outer sleeve 70. In embodiments, such an intumescent material may swell when exposed to heat, so as to increase in volume and decrease in density. In embodiments, the second layer 76 may be thicker (e.g., in the radial direction) than the first layer 72, the first intermediate layer 74, the second intermediate layer 78, and/or the third layer 80. For example and without limitation, the second layer 76 may be at least three times as thick as the first layer 72 or the third layer 80, and/or may be at least ten times as thick as the first intermediate layer 74 or the second intermediate layer 78.

With embodiments, as generally illustrated in FIGS. 7 and 8, the reinforcement may be in the form of one or more strands 174 of a rigid, non-rubber material embedded in at least one of the first layer 72, second layer 76, and third layer 80. The material may be, but is not limited to, fiberglass. The strand(s) 174 may prevent or reduce the loss of material (e.g., silicone) of the respective first layer 72, second layer 76, and/or third layer 80 during exposure to high temperatures (e.g., fire) while still permitting the respective layer 72, 76, 80 to grow radially outward via extrusion.

In embodiments, the strand(s) 174 may be embedded in the respective layer 72, 76, 80 by first laying the strand(s) 174 on a strip of uncured material of the layer 72, 76, 80 (i.e., the layer 72, 76, 80 in a flat and/or unrolled state), such as generally illustrated in FIG. 7. The strand(s) 174 generally may run along the length of the strip. The strand(s) 174 may run the entire length of the strip or just a portion. While FIG. 7 illustrates the stands 174 as having a straight orientation, it should be appreciated that the strands 174 may have one or more bends and/or curves. The strands 174 may further form a mesh configuration, such as the mesh configuration illustrated in FIG. 4. The strip with the strand(s) 174 may then be wrapped around the locking sleeve 36 (with the side of the strip with the strand(s) 174 facing away from the locking sleeve 36) multiple times such that the strand(s) 174 may become embedded within the material to form the respective layer 72, 76, 80, such as generally illustrated in FIG. 8. As such, the strand(s) 174 may have a spiral configuration in the layer 72, 76, 80.

With embodiments, a fluid coupling 20 may be configured for use with fluid, such as, for example and without limitation, fuel (e.g., aircraft fuel) and/or oil (e.g., hydraulic oil). A fluid coupling 20 may include one or more components that include metal. For example and without limitation, the first coupling member 30, the second coupling member 32, the nut 34, the locking sleeve 36, the valve sleeve 38, the poppet valve 40, and/or the tubular valve 46 may include metal. A fluid coupling 20 may comply with AS1055.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid coupling, comprising
a first coupling member;
a second coupling member configured for connection with the first coupling member; and
a sleeve disposed at least partially around the first coupling member and/or the second coupling member, the sleeve including at least:
a first flame-retardant layer;
a second flame-retardant layer; and a first intermediate layer disposed between the first flame-retardant layer and the second flame-retardant layer, wherein the first intermediate layer is configured as a cylindrical mesh including woven wires and one or more apertures between the woven wires.

2. The fluid coupling of claim 1, wherein one or both of the first flame-retardant layer and the second flame-retardant layer include silicone.

3. The fluid coupling of claim 1, wherein the first intermediate layer is comprised of metal.

4. The fluid coupling of claim 1, wherein openings in the cylindrical mesh are configured to receive expanding portions of one or both of the first flame-retardant layer and the second flame-retardant layer.

5. The fluid coupling of claim 1, wherein at least one of the first flame-retardant layer and the second flame-retardant layer is configured as a plurality of sections.

6. The fluid coupling of claim 1, wherein the second flame-retardant layer is thicker than each of the first flame-retardant layer and the first intermediate layer.

7. The fluid coupling of claim 6, wherein the second flame retardant layer is at least three times thicker than the first flame-retardant layer.

8. The fluid coupling of claim 6, wherein the second flame retardant layer is at least ten times thicker than the first intermediate layer.

9. The fluid couple of claim 1, further comprising a third flame-retardant layer and a second intermediate layer.

* * * * *